United States Patent [19]

Hara et al.

[11] Patent Number: 4,460,254
[45] Date of Patent: Jul. 17, 1984

[54] INSTANT CAMERA

[75] Inventors: Yoshio Hara; Tadayoshi Shibata, both of Kanagawa, Japan

[73] Assignee: Fuji Photo Film Co., Ltd., Minami-ashigara, Japan

[21] Appl. No.: 379,541

[22] Filed: May 18, 1982

[30] Foreign Application Priority Data

May 26, 1981 [JP] Japan .................................. 56-79918

[51] Int. Cl.³ .............................................. G03B 17/50
[52] U.S. Cl. ..................................................... 354/86
[58] Field of Search ..................... 354/85, 86, 303, 304

[56] References Cited

U.S. PATENT DOCUMENTS

| 2,972,532 | 2/1961 | Land | 354/86 X |
| 3,241,468 | 3/1966 | Wolff | 354/304 |
| 3,690,238 | 9/1972 | Nerwin | 354/86 |
| 3,948,662 | 4/1976 | Alston et al. | 354/304 |

Primary Examiner—John Gonzales
Attorney, Agent, or Firm—Sughrue, Mion, Zinn, Macpeak and Seas

[57] ABSTRACT

A self-processing type film unit for an instant camera having a pair of flexible sheets sandwiching a photosensitive layer forming an image forming area at the intermediate portion of the film unit is provided with a developing solution container at its leading end portion and a solution trapping member for trapping excess solution at its trailing end. Several film units are stacked in a package and put into the instant camera. The camera discharges the film units from the package one by one after exposure to light and then feeds them in between a pair of spreading rollers. The rollers rotate with the film unit pinched between them to discharge it outside the camera. When the film unit is passed between the rollers, the developing solution container is broken by the nipping force of the rollers to release the solution contained therein. The released solution is distributed over the image forming area to develop the image on the spot, pushed by the rollers. In such an instant camera, the film package is positioned in the camera with respect to the rollers so that at the time when the film unit is initially brought into contact with one of the rollers, one of the major surfaces of the unit lies in a plane offset from the plane perpendicular to the plane including both the longitudinal axes of the rollers and tangent to the spreading roller with which the one major surface of the film unit is to be brought into contact.

4 Claims, 8 Drawing Figures

INSTANT CAMERA

BACKGROUND OF THE INVENTION

1. Field of the Invention

This invention relates to an instant camera using a self-processing type film unit in which developing solution contained in the film unit is distributed over an image forming area thereof after exposure to light to develop it on the spot.

2. Description of the Prior Art

There has come into wide use an instant camera in which a self-processing type film unit is used. An example of such an instant camera is disclosed in Japanese Unexamined Patent Publication No. 52(1977)-119224, while in Japanese Unexamined Patent Publication No. 50(1975)-153628 is disclosed an example of a film unit for an instant camera. Generally, the self-processing type film unit comprises a flexible base sheet having an image forming area bearing thereon a photosensitive layer, a flexible cover sheet superposed on the base sheet, a developing solution container disposed between the sheets near the leading end of the film unit, and means for trapping excess developing solution disposed near the trailing end of the film unit.

A plurality, typically ten, of the film units are stacked in a container to form a film package, and the film package is loaded in the instant camera.

The instant camera is arranged to discharge an exposed film unit from the container and to feed the exposed film unit in between a pair of spreading rollers which are rotated while nipping the film unit to discharge it outside the camera body. When the leading end portion of the film unit is passed between the spreading rollers, the developing solution container disposed therein is broken by the nipping force of the rollers and the solution is released. The released developing solution is spread or distributed over the image forming area which has been exposed, pushed by the spreading rollers.

In conventional instant camera, there have been problems that the thickness of the spread developing solution fluctuates depending on the ambient temperature or depending on the number of the film units remaining in the package at the time, which adversely affects the quality of the obtained image. For example, in case of a package containing therein ten film units, the fluctuation in the thickness of the spread solution may reach up to 10 to 20% between the first unit and the last unit. When the fluctuation in the thickness of the spread solution occurs, the amount of the solution the trapping member should trap naturally fluctuates. When the amount of the solution to be trapped by the trapping member is too large, a part of the solution may leak out of the unit. Or otherwise, the leading end portion of the spread solution may become wavy in the direction of the width of the unit, and in such case the solution cannot be uniformly distributed over the entire image forming area. Further, the fluctuation in the thickness of the spread solution may result in fluctuations in the density and the color balance of the obtained image.

SUMMARY OF THE INVENTION

The primary object of the present invention is to provide an instant camera in which the fluctuation in the thickness of the spread developing solution between individual film units can be greatly reduced.

Another object of the present invention is to provide an instant camera in which the influence of the ambient temperature on the thickness of the spread solution can be compensated for to maintain the thickness relatively constant.

The present invention is based on a discovery that the fluctuation in the thickness of the spread developing solution can be greatly reduced by feeding the film unit when it is being discharged from the package so that the plane in which one of the major surfaces of the film unit lies at the time when the film unit is initially brought into contact with one of the spreading rollers is offset from the plane perpendicular to the plane including both the longitudinal axes of the spreading rollers and tangent to the roller with which said one major surface of the film unit is to be brought into contact, which is in contrast to the conventional arrangement wherein these two planes coincide with each other, as will be described in detail referring to the attached drawings.

Said two planes can be offset from each other, for example, by positioning the film package in the camera with respect to the spreading rollers so that the film unit discharging slot of the package is located out of alignment with the space between the spreading rollers in the direction perpendicular to the major surface of the film unit or by providing a deflecting member between the spreading rollers and the film unit discharging slot of the package for deflecting the film unit in the direction perpendicular to the major surface thereof.

Generally, the average thickness of the spread solution is increased as the amount of the offset of the plane in which said one major surface of the unit lies when the film unit is initially brought into contact with one of the spreading rollers (this plane will be referred to as "plane X" hereinbelow) from said plane perpendicular to the plane including both the longitudinal axes of the rollers and tangent to the roller with which said one major surface of the unit is to be brought into contact (this plane will be referred to as "plane Y" hereinbelow) toward the exposure side of the camera is increased, and vice versa. Further, the average thickness of the spread solution is apt to be reduced (increased) as the ambient temperature becomes high (low).

Thus it is possible to compensate for the influence of the ambient temperature on the thickness of the spread solution by changing the amount of the offset of the plane X from the plane Y under the control of a temperature sensitive member. For example, the camera is arranged so that the position of the film package in the camera with respect to the spreading rollers can be changed under the control of the temperature sensitive member, or the deflecting member between the film package and the rollers can be moved back and forth toward the exposure side of the camera under the control of the same.

In accordance with an experiment carried out by the inventors, the amount of the fluctuation in the thickness of the spread solution between the first film unit and the tenth film unit was reduced to 5 to 8 μm in the instant camera in accordance with the present invention, while in case of a conventional instant camera in which said planes X and Y coincide with each other and in which the film unit is discharged from the camera in curved condition after passing between the spreading rollers (as, for example, in the case of an instant camera manufactured by Eastman Kodak), the amount of the same was 10 to 15 μm.

Further, it has been found that the amount of the fluctuation in the thickness of the spread solution in the transverse direction of the unit is reduced to 6 to 12 μm, whereby the unevenness in the density in a single image becomes negligible, whereas the amount of the same in the conventional instant camera is as high as 12 to 18 μm.

Further, it has been found that in case of the instant camera of the present invention the amount of the fluctuation in the thickness of the spread solution between the first unit and the tenth unit can be reduced to as small as 1 to 3 μm by straightly feeding the unit after passing it between the spreading rollers to discharge it outside the camera.

DETAILED DESCRIPTION OF THE INVENTION

Figure 1:
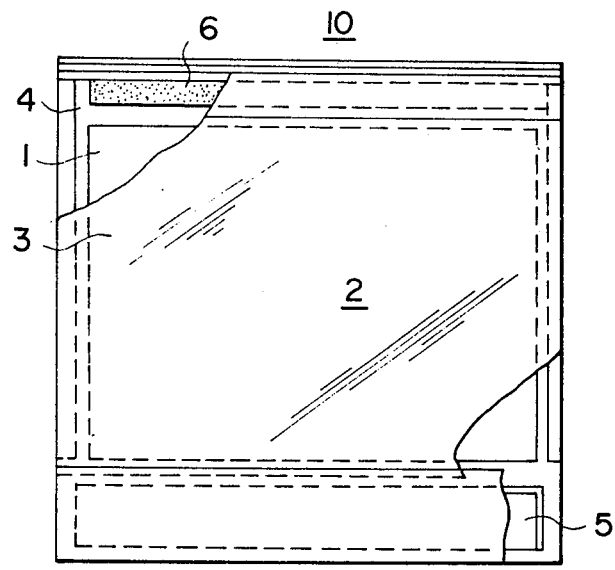
FIG. 1 is a plan view partly broken away showing an example of a self-processing type film unit for an instant camera.

FIG. 1 shows an example of a self-processing type film unit. The film unit 10 comprises a flexible base sheet 1 bearing thereon a photosensitive layer which forms an image forming area 2 of the film unit, a flexible cover sheet 3 superposed on the base sheet 1 to assist in evenly spreading developing solution to a predetermined thickness over the image forming area, and a connecting element 4 connecting the base sheet 1 and the cover sheet 3. Between the base sheet 1 and the cover sheet 3 near the leading end thereof (the lower end as seen in FIG. 1), is disposed a developing solution container 5 which contains therein the developing solution and which can be broken to discharge the developing solution in between the base sheet 1 and the cover sheet 3 toward the image forming area 2 when a pressure larger than a predetermined value is imparted thereto. Further, a trapping member 6 for trapping excess of the developing solution discharged from the container 5 is provided near the trailing end opposite to the leading end.

Figure 2:
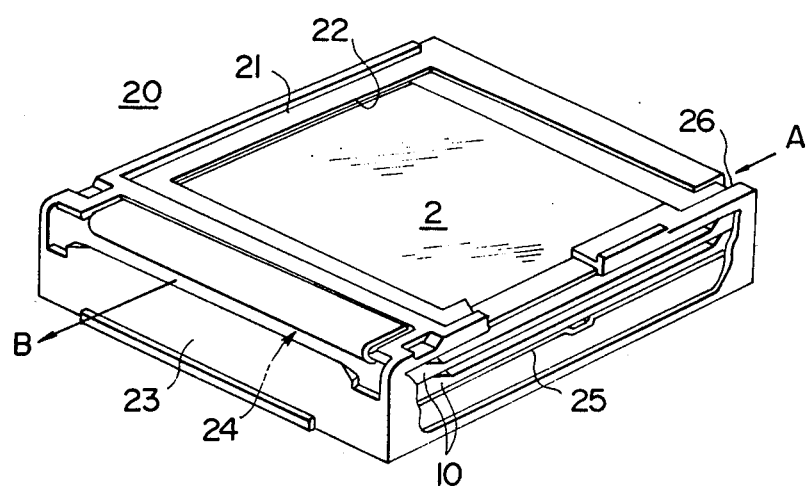
FIG. 2 is a perspective view of an example of a film package for an instant camera.

A plurality, e.g., ten, of the film units 10 are stacked and put into a container to form a film package 20 as shown in FIG. 2. The container of the package 20 is in the form of a box comprising a top plate 21 having an opening 22 for exposure formed therein, and a front plate 23 having adjacent to the top plate 21 an elongated outlet slot 24 for discharging the film units 10 one by one. The film units 10 are positioned in the container of the package 20 with the developing solution container 5 thereof directed toward the front plate 23 and the image forming area 2 aligned with the opening 20 in the top plate 21, and urged upward toward the top plate 21 by means of a plate spring member 25.

Figure 3:
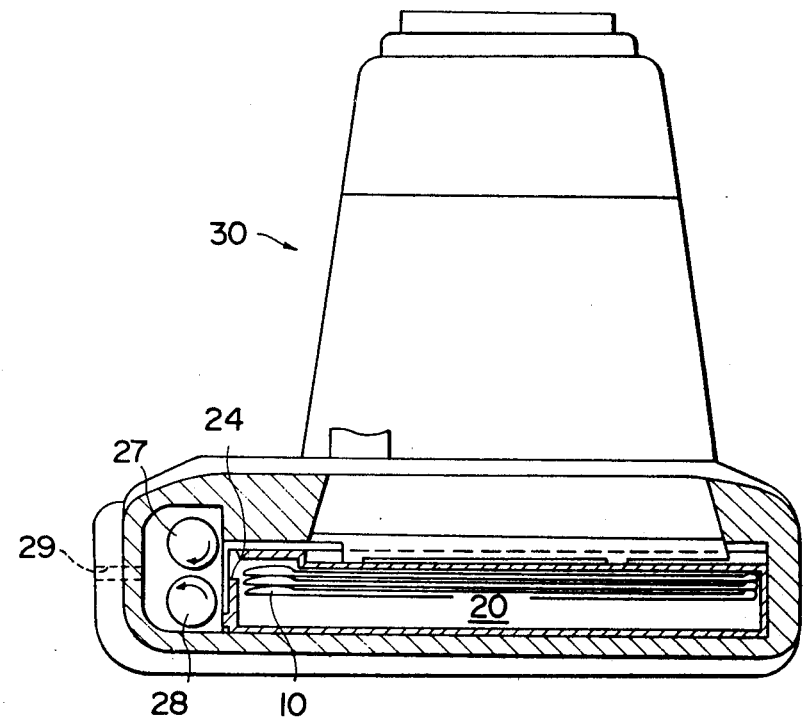
FIG. 3 is a top view partly broken away showing an example of a conventional instant camera.

FIG. 3 shows an example of a conventional instant camera 30 using the film package 20. When the film package 20 is loaded in the camera 30 and the uppermost film unit 10 is exposed to light, a film feeding member (not shown) in the camera 30 is moved forwardly (in the direction of the arrow A in FIG. 2) through a groove 26 in the film package 20 to be engaged with the trailing edge of the uppermost unit 10, whereby the uppermost unit 10 is pushed toward the outlet slot 24 in the front plate 23 of the package 20 so that leading end portion thereof projects outside the container through the slot 24 (in the direction of the arrow B in FIG. 2). The leading end portion of the film units 10 within which said developing solution container 5 is disposed is thus fed to the nipping point of a pair of spreading rollers 27 and 28 provided in the camera 30, and then the film unit 10 is further advanced to be discharged from a film discharging slot 29 of the camera 30 by means of the rollers 27 and 28 which are rotated clockwisely and counterclockwisely, respectively, in FIG. 3.

The film unit 10 is compressed between the rollers 27 and 28 over the entire length thereof, i.e., from the leading end thereof to the trailing end thereof, when passed between the rollers 27 and 28, whereby the developing solution container 5 is broken to release the developing solution contained therein. The released solution is spread over the already exposed image forming area 2 pushed by the rollers 27 and 28, and excess of the solution, if any, is introduced into the trapping member 6. In the conventional instant camera 30, the film package 20 is located in the camera body with respect to the pair of spreading rollers 27 and 28 so that the film unit 10 is fed in between the rollers 27 and 28 straightly moved along a plane perpendicular to the plane containing both the longitudinal axes of the rollers 27 and 28 with the film unit 10 kept in straightly stretched condition.

In the conventional instant camera, there have been problems that the thickness of the spread developing solution fluctuates depending on the ambient temperature or depending upon the number of the film units remaining in the package at the time, which adversely affects the quality of the obtained image. For example, in case of a package containing therein ten film units, the fluctuation in the thickness of the spread solution may reach up to 10 to 20% between the first unit and the last unit. When fluctuation in the thickness of the spread solution occurs, the amount of the solution the trapping member 6 should trap naturally fluctuates. When the amount of the solution to be trapped by the trapping member 6 is too large, a part of the solution may leak out of the unit 10. Or otherwise, the leading end portion of the spread solution may become wavy in the direction of the width of the unit, and the solution cannot be uniformly distributed over the entire image forming area 2. Further, the fluctuation in the thickness of the spread solution may result in fluctuations in the density and the color balance of the obtained image.

Figure 4:
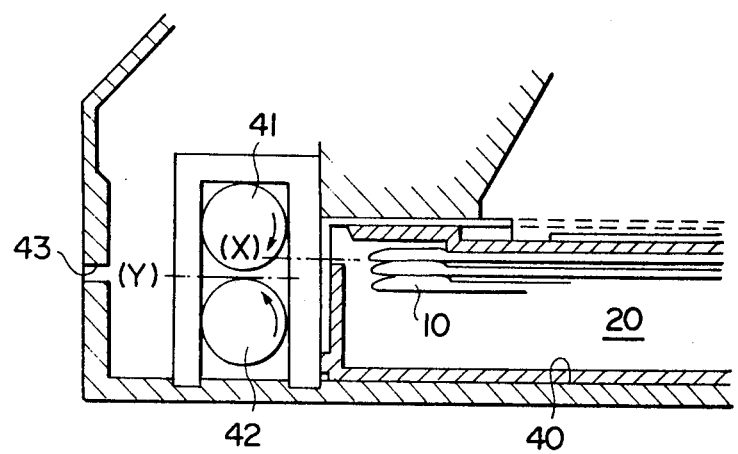
FIG. 4 is a fragmentary cross sectional view of an instant camera in accordance with an embodiment of the present invention.

FIG. 4 shows a part of an instant camera in accordance with an embodiment of the present invention. In the instant camera of this embodiment, a film package of the same type as that shown in FIG. 2 may be used. The camera has a film package receiving cavity 40, a pair of spreading rollers 41 and 42, and a film unit discharging slot 43. The film package receiving cavity 40 and the pair of rollers 41, 42 are positioned with respect to each other so that at the time when a film unit 10 is initially brought into contact with one of the rollers 41 and 42, one of the major surfaces of the film unit 10 lies in a plane which is offset from the plane perpendicular to the plane including both the longitudinal axes of the roller 41 and 42 and tangent to the roller with which said one major surface of the film units 10 is to be brought into contact. In FIG. 4, the plane in which said one major surface of the film unit lies at the time when the film unit 10 is initially brought into contact with one of the rollers 41 and 42 is denoted by X, while the plane perpendicular to the plane including both the longitudinal axes of the rollers 41 and 42 and tangent to the roller with which the one major surface of the film unit is to be brought into contact is denoted by Y. In the particular embodiment shown in FIG. 4, said one of the major surfaces of the film unit 10 is the lower surface thereof, and said one of the rollers with which the one major surface of the film unit 10 is to be brought into contact is the lower roller 42.

The film unit 10 is straightly fed through the outlet slot of the package 20 in parallel to the base wall of the film package 20 until it is brought into contact with the upper roller 41, with the lower surface of the unit 10 lying in the plane X, and then the leading end portion of the unit is deflected downwardly to be inserted between the rollers 41 and 42. Thereafter, the film unit 10 is discharged through the film unit discharging slot 43 driven by the rollers 41 and 42 with the lower surface thereof being straightly moved along the plane Y.

In the embodiment of FIG. 4, the planes X and Y are positioned so that the plane X is offset from the plane Y in parallel thereto upwardly as seen in FIG. 4 or toward the exposure side of the camera. However, the plane X may be reversely offset from the plane Y. On the other hand, in the conventional instant camera, the planes X and Y coincide with each other as can be seen from FIG. 3.

In order to find relationships between the fluctuation in the thickness of the spread developing solution and the position of the plane X with respect to the plane Y, i.e., the distance between the planes and the direction in which the plane X is offset from the plane Y, an experiment was carried out using the camera similar to one shown in FIG. 4 in which the distance between the planes and the direction of the offset were changed variously and the thickness of the solution was measured in each condition with a film package including ten film units being used. The result was as follows.

When the plane X was offset upwardly (in FIG. 4) from the plane Y by a distance of 0.5 mm, the average thickness of the spread solution increased by about 5 $\mu$m compared with the same when the planes X and Y coincided with each other, but the amount of the fluctuation in the thickness of the spread solution in ten film units within a package was reduced to about 1.5 $\mu$m in case of the former, while in case of the latter the amount of the fluctuation was about 6 $\mu$m. On the other hand, when the plane X was downwardly offset from the plane Y by a distance of 0.5 mm, the average thickness of the spread solution was reduced by about 5 $\mu$m compared with the same when the planes X and Y coincided with each other, but the amount of the fluctuation was reduced from about 6 $\mu$m to about 1.5 $\mu$m. Thus it has been found that the amount of the fluctuation in the thickness of the spread solution can be reduced by offsetting the plane X from the plane Y in either direction.

Figure 5:
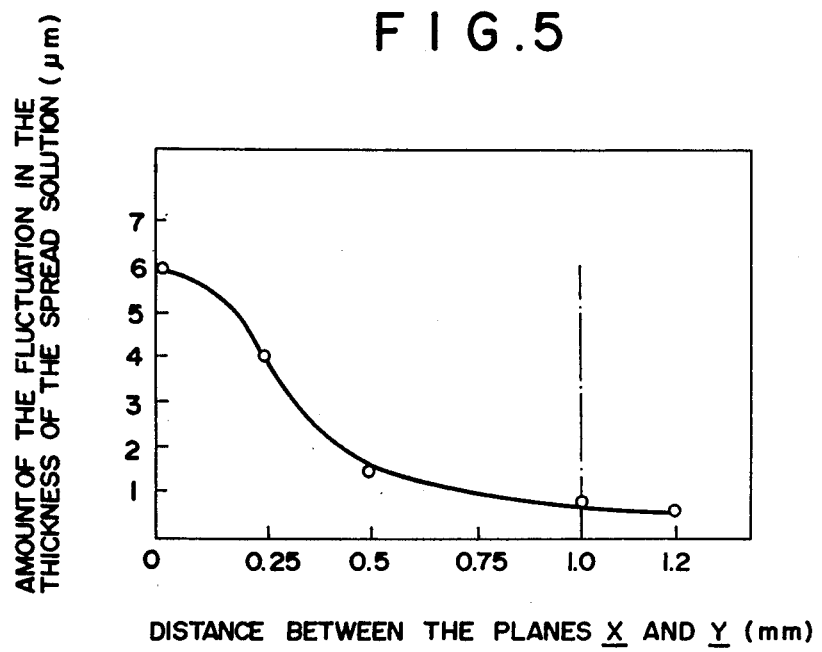
FIG. 5 is a graph showing the relationship between the distance between the planes X and Y, and the amount of the fluctuation in the thickness of the spread solution in ten film units within one package for proving the effect of the present invention.

FIG. 5 is a graph showing the relationship between the distance (in absolute value) between the planes X and Y and the amount of the fluctuation in the thickness of the spread developing solution i.e., the difference between the thickness of the spread solution in the first film unit and that of the tenth or last film unit in one package. As can be seen from FIG. 5, the fluctuation in the thickness of the spread solution is reduced as the distance between the planes X and Y is increased. However, it has been found that when the distance is not less than 1.0 mm, the developing solution may be unevenly distributed over the entire image forming area 2. Therefore, it is preferred that the distance be smaller than 1.0 mm.

Further, it has also been found that the fluctuation in the thickness of the spread solution in a single film unit as measured in the direction of the width thereof can be reduced to about 8 $\mu$m in the instant camera of the present invention, while the same of the conventional instant camera where the planes X and Y coincide with each other is about 13 $\mu$m.

Figure 6:
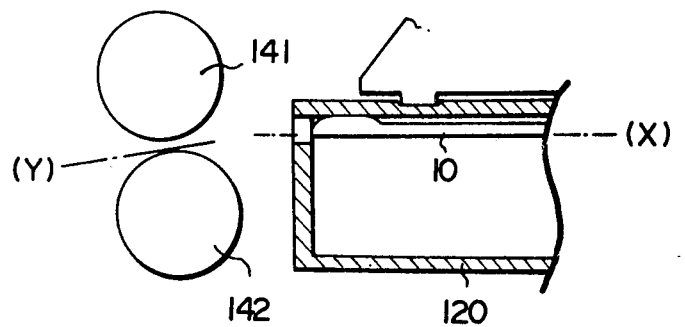
FIGS. 6 to 8 are fragmentary cross sectional views respectively showing other embodiments of the present invention.
Figure 7:
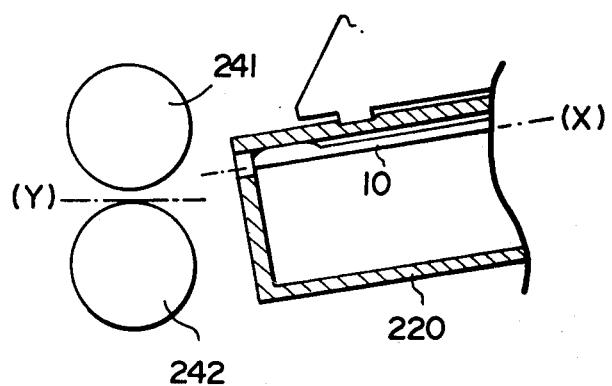
Figure 8:
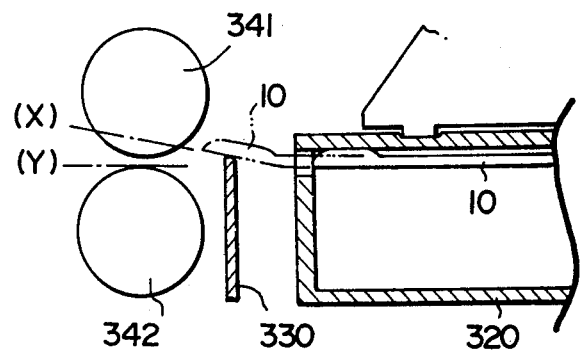

In the embodiment shown in FIG. 4, the planes X and Y are offset from each other by moving the package receiving cavity 40 and the spreading rollers 41, 42 relative to each other in the direction of the thickness of the stack of the film units 10, i.e., in the direction perpendicular to the major surface of the unit. FIGS. 6 to 8 respectively show other embodiments of the present invention in which the planes X and Y are offset from each other in a manner other than that described above in connection with FIG. 4.

In the embodiment of FIG. 6, spreading rollers 141 and 142 are out of vertical alignment with each other so that the plane including both the longitudinal axes of the respective rollers is inclined with respect to the vertical, whereby the plane Y is inclined with respect to the horizontal to form an angle with respect to the plane X which is kept horizontal. Reversely, in the embodiment shown in FIG. 7 spreading rollers 241 and 242 are in vertical alignment and, the plane X is inclined with respect to the horizontal to form an angle with respect to the plane Y which is kept horizontal by locating a film package 220 inclined with respect to the vertical.

In the embodiment shown in FIG. 8, the relative position between the film package 320 and the pair of spreading rollers 341 and 342 is the same as in the conventional instant camera shown in FIG. 3, and the plane X is offset from the plane Y by providing a deflecting member 330 between the package 320 and the spreading rollers 341 and 342 instead of changing the relative position therebetween.

Generally, the thickness of the spread developing solution is apt to be reduced as the ambient temperature becomes high, and vice versa. As described above in connection with the embodiment shown in FIG. 4, the thickness of the spread solution is increased as the amount of the offset of the plane X from the plane Y toward the exposure side of the camera is increased, and vice versa, in case that the planes X and Y are offset from each other in parallel.

It is thus possible to compensate the influence of the ambient temperature on the thickness of the spread solution by changing the position of the plane X relative to the plane Y depending on the ambient temperature. This can be accomplished by mounting the spreading rollers and the film package receiving cavity to be movable relative to each other up and down (as seen in FIG. 4) under the control of a temperature sensitive member such as a bimetal plate. It has been found that, with this arrangement, the difference between the average thickness of the spread solution at an ambient temperature of 5° C. and the same at an ambient temperature of 40° C. can be reduced to 1 to 3 μm, while the difference is 5 μm in case of the conventional instant camera where the planes X and Y fixedly coincide with each other.

In the embodiments of the present invention respectively shown in FIGS. 6 to 8, the thickness of the spread solution is increased as the height at which the leading end of the film unit 10 initially abuts against the spread roller becomes high, and vice versa. Thus, also the embodiments respectively shown in FIGS. 6 to 8 can be modified to compensate for the influence of ambient temperature on the thickness of the spread solution by mounting the rollers 141 and 142 to be swingable with respect to the vertical, by making the film package 220 swingable with respect to the vertical, and mounting the deflecting member 330 movable up and down, respectively. When making the deflecting member 330 movable up and down in the embodiment of FIG. 8, it is necessary for the deflecting member to have a shape adapted to urge the film unit in either direction.

Although, the relative position between the lower surface of the film unit and the lower spreading roller with which the lower surface of the unit is brought into contact has been explained by way of an example in the above description, the effect of the present invention can naturally be obtained by controlling the relative position between the upper surface of the film unit and the upper roller with which the upper surface of the unit is brought into contact.

We claim:

1. An instant camera in which a self-processing type film unit having a developing solution container disposed in the leading end portion thereof and an image forming area bearing thereon a photosensitive layer is fed in between a pair of parallel spreading rollers after exposure to light, the rollers being adapted to be rotated nipping therebetween the film unit to discharge the same outside the camera body and the developing solution container being adapted to be broken by nipping force of the rollers when passed therebetween to release the developing solution contained therein, whereby the released solution is spread over the image forming area pushed by the rollers to develop the image on the spot, the improvement comprising said film unit being fed toward the spreading rollers so that at the time when the film unit is initially brought into contact with one of the spreading rollers, one of the major surfaces of the film unit lies in a plane offset from the plane perpendicular to the plane including both the longitudinal axes of the spreading rollers and tangent to the point of contact on the spreading roller by said one major surface of the film unit, said film units stacked in a container having an outlet opening to form a film package with the leading end of each film unit directed toward the outlet opening, and the film package is loaded in the camera body in a position with respect to said spreading rollers in which the film unit discharged through the outlet opening is fed toward the spreading rollers with said one major surface thereof being moved along a plane offset from said plane perpendicular to the plane including both the longitudinal axes of the spreading rollers and tangent to the spreading roller with which said one major surface is to be brought into contact, and said film package is loaded in the camera body so that said film unit is fed in a plane parallel to and offset from the plane perpendicular to the plane including both the longitudinal axes of the spreading rollers and tangent to the spreading roller with which said one major surface of the film unit is to be brought into contact, in a direction perpendicular to the former plane.

2. An instant camera in which a self-processing type film unit having a developing solution container disposed in the leading end portion thereof and an image forming area bearing thereon a photosensitive layer is fed in between a pair of parallel spreading rollers after exposure to light, the rollers being adapted to be rotated nipping therebetween the film unit to discharge the same outside the camera body and the developing solution container being adapted to be broken by nipping force of the rollers when passed therebetween to release the developing solution contained therein, whereby the released solution is spread over the image forming area pushed by the rollers to develop the image on the spot, the improvement comprising said film unit being fed toward the spreading rollers so that at the time when the film unit is initially brought into contact with one of the spreading rollers, one of the major surfaces of the film unit lies in a plane offset from the plane perpendicular to the plane including both the longitudinal axes of the spreading rollers and tangent to the point of contact on the spreading roller by said one major surface of the film unit, said film units are stacked in a container having an outlet opening to form a film package with the leading end of each film unit directed toward the outlet opening, and the film package is loaded in the camera body in a position with respect to said spreading rollers in which the film unit discharged through the outlet opening is fed toward the spreading rollers with said one major surface thereof being moved along a lane offset from said plane perpendicular to the plane including both the longitudinal axes of the spreading rollers and tangent to the spreading roller with which said one major surface is to be brought into contact and said package and the spreading rollers movable relative to each other under the control of temperature sensitive means to change the relative position between the plane in which said one major surface of the film unit lies at the time when the film unit is initially brought into contact with one of the spreading rollers and the plane perpendicular to the plane including both the longitudinal axes of the spreading rollers and tangent to the spreading roller with which said one major surface of the film unit is to be brought into contact dependent on the ambient temperature.

3. An instant camera in which a self-processing type film unit having a developing solution container disposed in the leading end portion thereof and an image forming area bearing thereon a photosensitive layer is fed in between a pair of parallel spreading rollers after exposure to light, the rollers being adapted to be rotated nipping therebetween the film unit to discharge the same outside the camera body and the developing solution container being adapted to be broken by nipping force of the roller when passed therebetween to release the developing solution contained therein, whereby the released solution is spread over the image forming area pushed by the rollers to develop the image on the spot, the improvement comprising said film unit being fed toward the spreading rollers so that at the time when the film unit is initially brought into contact with one of the spreading rollers, one of the major surfaces of the film unit lies in a plane offset from the plane perpendicular to the plane including both the longitudinal axes of the spreading rollers and tangent to the point of contact on the spreading roller by said one major surface of the film unit, said film units stacked in a container having outlet opening to form a film package with the leading end of each film unit being directed toward the outlet opening and the film package is loaded in the camera body so that said outlet opening thereof lies in said plane perpendicular to the plane including both the longitudinal axes of the spreading rollers and tangent to the spreading roller with which said one major surface of the film unit is to be brought into contact, a deflecting member being provided between the outlet opening of the film package and the pair of rollers to deflect out of the former plane the film unit fed therealong, and said deflecting member movable with respect to the spreading rollers under the control of temperature sensitive means to change the relative position between the plane in which said one major surface of the film unit lies when the film unit is initially brought into contact with one of spreading rollers and the plane perpendicular to the plane including both the longitudinal axes of the spreading rollers and tangent to the spreading roller with which said one major surface of the film unit is to be brought into contact dependent on the ambient temperature.

4. An instant camera in which a self-processing type film unit having a developing solution container disposed in the leading end portion thereof and an image forming area bearing thereon a photosensitive layer is fed in between a pair of parallel spreading rollers after exposure to light, the rollers being adapted to be rotated nipping therebetween the film unit to discharge the same outside the camera body and the developing solution container being adapted to be broken by nipping force of the rollers when passed therebetween to release the developing solution contained therein, whereby the released solution is spread over the image forming area pushed by the rollers to develop the image on the spot, the improvement comprising said film unit being fed toward the spreading rollers so that at the time when the film unit is initially brought into contact with one of the spreading rollers, one of the major surfaces of the film unit lies in a plane offset from the plane perpendicular to the plane including both the longitudinal axes of the spreading rollers and tangent to the point of contact on the spreading roller by said one major surface of the film unit, said plane in which said one major surface of the film unit lies at the time when the film unit is initially brought into contact with one of the spreading rollers being parallel to said plane perpendicular to the plane including both the longitudinal axes of the spreading rollers and tangent to the roller with which said one major surface of the film unit is to be brought into contact, and the distance therebetween being smaller than 1.0 mm.

* * * * *